April 9, 1935. Y. KATO ET AL 1,997,193

PERMANENT MAGNET AND METHOD OF MANUFACTURING SAME

Filed June 16, 1932

Inventors
Yogoro Kato
Takeshi Takei

By
their Attorney.

Patented Apr. 9, 1935

1,997,193

UNITED STATES PATENT OFFICE 1,997,193

PERMANENT MAGNET AND METHOD OF MANUFACTURING SAME

Yogoro Kato, Ebara-Machi, Tokyo, and Takeshi Takei, Shinagawa-Machi, Tokyo, Japan, assignors to The Mitsubishi Denki Kabushiki-Kaisha, a corporation of Japan Application June 16, 1932, Serial No. 617,520
In Japan December 25, 1930

8 Claims. (Cl. 175—21)

Our invention relates to improvements in permanent magnets and more particularly to those consisting of a coherent body of metal oxides.

Permanent magnets have heretofore been made of solid blocks of metallic alloys, such as carbon-steels. Carbon-steel containing about 1.2% of carbon by weight, has relatively high retentivity, and cobalt-steel alloy is also well-known as having good properties as a permanent magnet. However, it is very difficult to form these metallic alloys, especially cobalt-steel alloy, into desired shapes and dimensions, particularly for strong permanent magnets.

In order to facilitate the formation of permanent magnets, it has been proposed to utilize granular metals or metal powders in an agglomerated form, but no satisfactory result has been obtained, mainly due to oxide film covering the metal particles, which film obstructs the magnetic property. We have found that, if certain kinds of metal oxides, for example, iron oxide and cobalt oxide, are combined or united together in powdered form and made into a compact or coherent body through suitable treatment as described hereinafter, a very good material for permanent magnets is obtained, with an extremely high coercive force, as high as five times that of the above-mentioned carbon-steel alloy. We have also found that if iron oxide and cobalt oxide in powdered form are mixed intimately and made into a compact body and treated as hereinafter described, a similar superior magnet is obtained.

Our improved magnet has many other advantages. Since the materials are oxides of metals, there will be practically no further oxidation of the magnet body at ordinary temperatures resulting in the formation of rust. Our improved magnets are made in coherent agglomerated form, and may be formed into any desired shapes and dimensions in a relatively simple and economical way. Our improved magnets are also economical to manufacture because practically all waste is eliminated.

It is, therefore, an object of our invention to provide permanent magnets with high coercive force.

Another object of our invention is to provide permanent magnets which are not oxidized materially to rust.

A further object of our invention is to provide a method of manufacturing permanent magnets in a simple and economical manner.

A still further object of our invention is to obtain a permanent magnet with its poles at any desired spots or area of the body, such selective location of the poles being possible due to the extremely high coercive force of our improved magnet.

Other objects and particularities of our said invention will be fully and completely described hereinafter, in connection with the accompanying drawing, wherein:—

Figure 1:
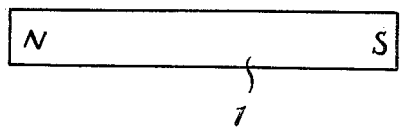
Fig. 1 is an elevational view of a simple permanent magnet embodying our invention.
Figure 2:
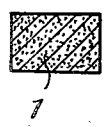
Fig. 2 is a sectional end view of the magnet shown in Fig. 1.

In a preferred embodiment of our invention, powdered material consisting of about 1 mol of ferrous oxide, about 2 mols of ferric oxide and about 1 mol of cobalt oxide is utilized. This powdered material is moulded to any desired shape and dimensions, for example to a simple bar-shape as shown in Figs. 1 and 2, compressing the material under a suitable hydraulic or mechanical pressure. A quantity of binding material, such as water glass, may be added if desired to the above-mentioned material before the compression. When the binding material is not used, the compressing pressure must be about 3000 to 4500 lbs. per square inch in order to obtain superior results. The pressure may be lower, if the binding material is utilized. In either case, the compression must be effected to such a degree that the particles are firmly united together or brought into sufficiently intimate contact with each other. After the compression, the agglomerated body is preferably heated to a temperature above 600° C. for sintering.

In another desirable embodiment of our invention, about 2.5 mols of ferric oxide and about 1 mol of cobalt oxide are mixed together in powdered form and the mixture is introduced into a mould wherein it is heated and sintered.

We have found that if the above-mentioned heating is effected in an inert or reducing atmosphere, such as hydrogen, carbon monoxide etc., or in an evacuated vessel, in order to prevent oxidation of the material or to reduce a part of the oxides, the coercive force and retentivity of the magnet are materially increased.

The body thus manufactured may be magnetized in a well-known manner, and a permanent magnet is obtained with an extremely high coercive force, as high as about five times that of the carbon-steel alloy. We have found that if the magnetization is effected at elevated temperatures, the coercive force of the magnet is further increased.

Figure 3:
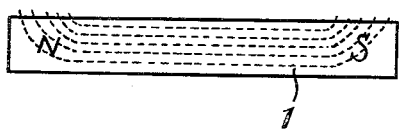
Fig. 3 is an elevational view of a magnet similar to that shown in Figs. 1 and 2, but with a different pole-disposition.
Figure 4:
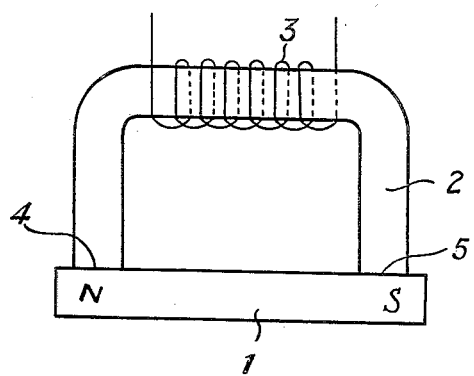
Fig. 4 shows diagrammatically a manner in which the magnet shown in Fig. 3 is magnetized.

In Figs. 1 and 2, a simple bar magnet 1 is shown embodying our invention. It has the north and south poles N and S as in an ordinary permanent bar magnet. The bar 1 however, may be magnetized in any other manner. For example, the poles N and S may be formed on one side of the bar 1 as shown in Fig. 3. In order to effect such magnetization, a magnetizing device, as shown in Fig. 4, comprising a core 2 and a magnetizing coil 3 wound thereon, is applied to the bar 1, with its pole faces 4 and 5 in contact with the respective portions of the side face of the bar 1 to have N and S poles. The winding 3 is energized from a suitable direct current source, not shown, to produce the necessary magnetomotive force.

Figure 5:
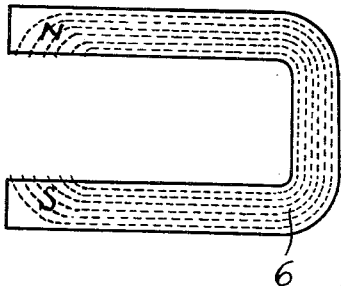
Fig. 5 is an elevation of a horse-shoe magnet embodying our invention with its poles at the inner side faces of the two legs.
Figure 6:
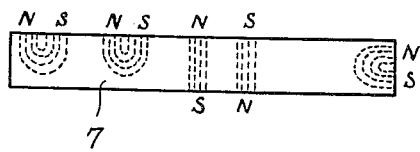
Fig. 6 is an elevation of a bar-shaped magnet with a plurality of poles at various parts of the magnet face.

Because of the fact that our magnet has an extremely high coercive force, the south and north poles may be formed thereon at any desired spot or surface, as shown in Fig. 3, and the poles are maintained permanently. Fig. 5 shows another example of our magnet, in which a horseshoe magnet 6 has its poles, N and S, on the inner side faces of the ends of both legs. In Fig. 6, a bar-shaped magnet 7 is shown with a plurality of N and S poles at various parts of its face.

Raw mixture to be utilized in preferred forms of our invention may conveniently be obtained in any of the following ways.

1st way:—1 mol of powdered magnetic iron oxide $FeO.Fe_2O_3$, a compound of ferrous oxide, $FeO$, and ferric oxide, $Fe_2O_3$, is mixed with 1 mol of powdered ferric oxide and 1 mol of powdered cobalt oxide.

2nd way:—1 mol of powdered magnetic iron oxide and 1 mol of powdered cobalt ferrite, $CoO.Fe_2O_3$ are mixed together.

3rd way:—1 mol of powdered cobalt oxide and 2.5 mols of powdered ferric oxide are mixed together, and 1.5 mols of the ferric oxide contained therein are reduced to magnetic oxide by heating the mixture in the presence of a reducing gas, such as carbon monoxide, hydrogen, ammonium, methane, etc. The reduction may be made by heating the mixture in an inert gas, such as nitrogen, or within an evacuated vessel. Such reduction occurs because the equilibrium tension of oxygen evolved by the thermal decomposition of ferric oxide is not very low when in the presence of cobalt oxide.

4th way:—1 mol of cobalt nitrate, $Co(NO_3)_2$, or equivalent quantity of other cobalt salt and 2.5 mols or powdered ferric oxide, or 5 mols of ferric nitrate or equivalent quantity of other ferric salt are mixed together, and heated to decompose the nitrates or other salts. 1.5 mol of the ferric oxide produced by the decomposition are subsequently reduced in the same manner as in the 3rd way.

5th way:—1 mol of powdered cobalt oxide and 5 mols of powdered ferric nitrate or equivalent quantity of other powdered ferric salt are mixed together, and heated to decompose the nitrates or other salts. 1.5 mol of the ferric oxide produced by the decomposition are subsequently reduced in the same manner principally as in the 3rd way.

The material obtained by any of the procedures described above is heated to a temperature above 600° C., and converted to a state suitable for permanent magnets of the present invention. This heating may be dispensed with if the heating for reduction or decomposition as in the third to the fifth ways above outlined was effected at a temperature above 600° C. The material thus obtained may be molded to the desired shape. Alternately, the heating at the temperature above 600° C. may be effected during the molding operation or thereafter. If the heating at the temperature above 600° C. is effected after the material is sufficiently compressed in the mould, the material is sintered in addition to the above mentioned conversion into a state suitable for permanent magnets, and the resulting product is a coherent mass or body, while if this heating is effected before the compression, a second heating at a temperature above 600° C. is necessary for sintering in order to obtain a coherent mass or body. However, if the binding material is utilized as hereinbefore stated, the second heating at the temperature above 600° C. for sintering is not necessary.

It is not objectionable that the above-mentioned material contain oxides of copper, zinc, barium, strontium, or magnesium, or a mixture thereof or a small quantity of impurities. Nor is it objectionable that it contains a small quantity of salt or salts of the above-mentioned metals, but it is preferable to heat the mixture to decompose such salts. These oxides or salts contribute to the formation of the coherent body of the material.

Although the magnetization of the coherent body may be effected at an ordinary temperature, it is preferable to effect the magnetization at a high temperature, say at 300° C., prior to the final magnetization at the normal temperature because we have found that the coercive force and remanence are thereby increased. Such magnetization under heating may be effected during the sintering process of the body, preferably while not after sintering.

In place of the oxide of cobalt, oxides of cobalt and of nickel may be used. In order to obtain powdered material consisting of oxides of iron, cobalt and nickel, the above-mentioned five ways may be followed by substituting a part of the cobalt with nickel. A mixture of 1 mol of magnetic oxide, 1 mol of ferric oxide, a half mol of cobalt oxide and a half mol of nickel oxide may also be utilized. The proportions of mixing the oxides may also be varied. We have found that the introduction of nickel oxide facilitates the sintering process and increases the mechanical property of the magnet. In place of nickel oxide, any other oxides of metals which facilitate the sintering, such as copper oxide, zinc oxide, chromium oxide, tungsten oxide, etc., may also be used for the same purpose.

While the invention has been described in considerable detail and specific examples given, it will be understood that the examples are to be construed as illustrative and not by way of limitation.

What we claim is:

1. A permanent magnet composed essentially of oxide of iron and oxide of cobalt.

2. A permanent magnet composed essentially of agglomerated particles of finely comminuted oxide of iron and oxide of cobalt.

3. A permanent magnet composed essentially of ferrous oxide, ferric oxide and oxide of cobalt.

4. A permanent magnet composed essentially of oxide of iron, oxide of cobalt and an oxide of a metal to promote sintering of said oxides.

5. A permanent magnet composed essentially of ferrous oxide, ferric oxide, oxide of cobalt and an oxide of a metal to promote sintering of said oxides.

6. The herein described method of manufacturing permanent magnets, comprising mixing together oxide of iron and oxide of cobalt, subjecting said oxides to heat to convert the same into magnetic form, subjecting said oxides to molding pressure to form a coherent body and magnetizing said body.

7. The herein described method of manufacturing permanent magnets, comprising mixing together oxide of iron and oxide of cobalt both in powdered form, subjecting said mixture to pressure of sufficient magnitude to agglomerate the particles into a coherent body and magnetizing said body.

8. The herein described method of manufacturing permanent magnets, comprising mixing together oxide of iron and oxide of cobalt, both in powdered form, molding said mixture under pressure, heating the molded body in a reducing atmosphere and magnetizing said body in the course of heating thereof.

YOGORO KATO.
TAKESHI TAKEI.